March 28, 1961 W. D. COCKRELL 2,977,523
CONTROL CIRCUIT
Filed Dec. 31, 1958
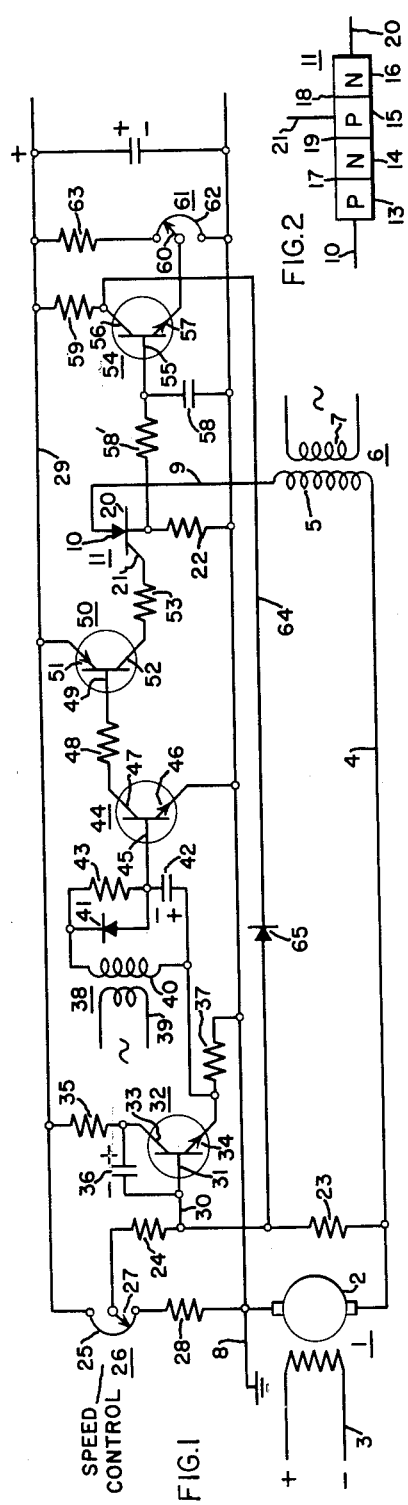
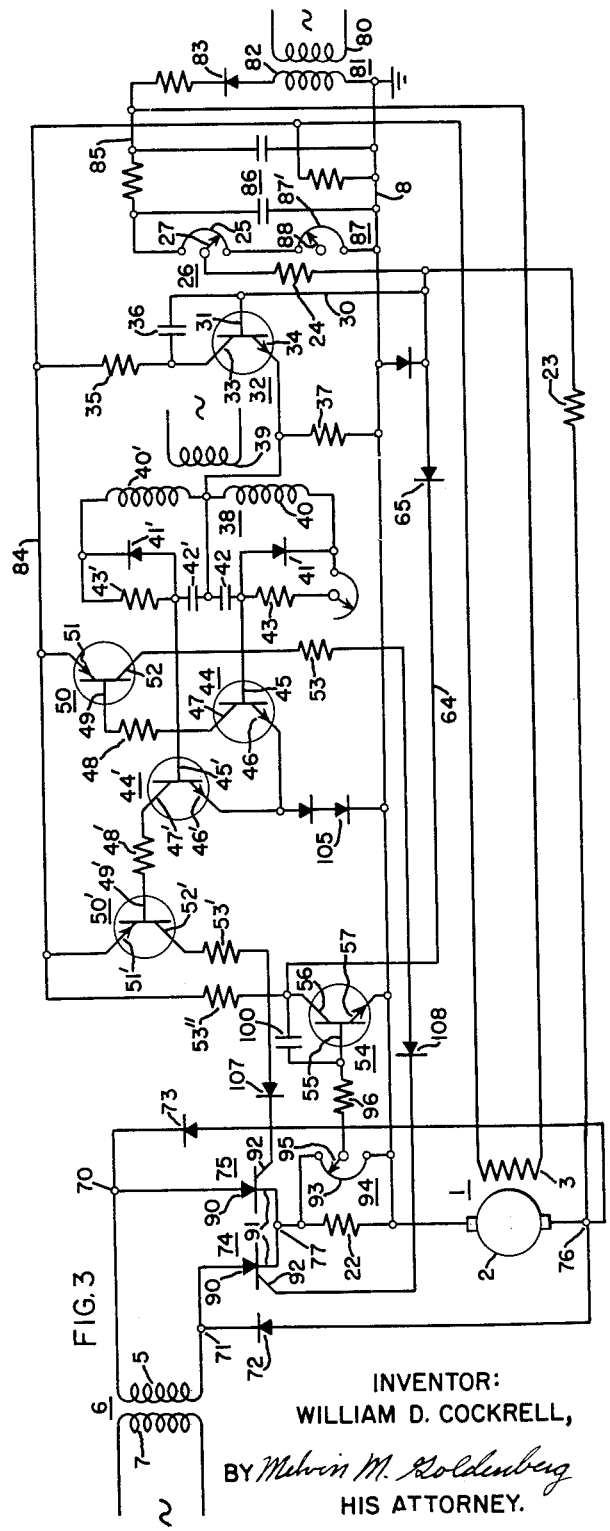
INVENTOR:
WILLIAM D. COCKRELL,
BY Melvin M. Goldenberg
HIS ATTORNEY.

United States Patent Office 2,977,523
Patented Mar. 28, 1961

2,977,523

CONTROL CIRCUIT

William D. Cockrell, Waynesboro, Va., assignor to General Electric Company, a corporation of New York Filed Dec. 31, 1958, Ser. No. 784,117

9 Claims. (Cl. 318—331)

This invention relates to novel control systems for supplying a D.C. voltage to a load from an alternating current source using controllable semi-conductor rectifying elements. More particularly, it relates to a novel control system utilizing controllable semi-conductor rectifiers in combination with means to supply controlling signals in response to requirements of a load.

It is an object of this invention to provide a novel control system utilizing semi-conductor, unilateral conducting devices susceptible of being controlled by the application of suitable signals to a control element thereof.

It is another object of this invention to provide a novel control system utilizing semi-conductor, unilateral conducting devices having control elements to which variable control signals may be applied in order to control the amount of energy supplied to a load.

It is a further object of this invention to provide a novel control system utilizing semi-conductor devices capable of conducting only in one direction and susceptible of being controlled by a system developing a control signal which is a function of an adjustable reference signal and a signal representative of a characteristic of the load.

It is a still further object of this invention to provide a novel control system for electric motors utilizing controllable semi-conductor rectifiers responsive to a control signal to control a characteristic of a dynamoelectric machine.

Briefly, the objects of my invention are achieved in one embodiment by the provision of a unilateral semi-conductor conducting device connected between a voltage source and a load, such as a direct current motor, to be supplied from an alternating source. The semi-conductor device includes a control electrode to which is supplied a control signal, the phase of which in relationship to the phase of the alternating voltage supplied from the source may be shifted in response to the magnitude of a difference voltage developed by comparing a signal voltage proportional to the motor speed and a variable speed reference voltage in order that the speed of the motor may be held to a predetermined value.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which:

Figure 1 is a schematic illustration of one embodiment of the invention;

Figure 2 is a diagrammatic illustration of a semi-conductor device usable in the invention; and Figure 3 is a schematic illustration of an alternative embodiment of the invention.

Referring to Figure 1 of the drawing, it may be seen that one embodiment of the invention is constituted by the provision of a load to be supplied from an alternating current source. In this instance, the load to be supplied is a direct current motor 1 having an armature 2 and a field winding 3. The field winding 3 is connected to be supplied from the source of direct current voltage (not shown), while the armature 2 is connected via a conductor 4 to one side of a secondary winding 5 of a transformer 6. A primary winding 7 of the transformer 6 is connected to be supplied from any suitable source of alternating current. A circuit for the flow of armature current is completed through the armature 2 of the motor 1 from a ground or neutral bus 8 and the transformer secondary winding 5. A conductor 9 connects one end of the winding 5 to the input electrode or anode 10 of a controllable semi-conductor rectifier 11 in order that voltage supplied to the armature 2 may be controlled. The controllable semi-conductor rectifier 11 is of the type illustrated in schematic form in Figure 2 of the drawing.

As may be seen in Figure 2, the controllable semi-conductor rectifier 11 may be formed out of contacting zones of positive and negative types of semi-conducting material so as to present four zones of such material 13, 14, 15 and 16 which form a pair of outside junctions 17 and 18 and an intermediate or center junction 19. The input electrode 10 and an output electrode 20 are provided and make ohmic contacts with the p-type zone 13 and with the n-type zone 16 respectively. A third or control electrode 21 makes an ohmic contact with the intermediate p-type zone 15. The characteristics of this device are such that when a positive voltage is applied to the input electrode 10 and a negative voltage is applied to the output electrode 20, the two outside junctions 17 and 18 are biased in a forward direction. However, the intermediate or center junction 19 is biased in a reverse direction and there exists only a minimum current flow through the device which can be ignored. Such current flow as does exist will be essentially a leakage current which is a function of the ambient temperature of the device. This condition will subsist until a current is applied to the control electrode or gate 21 which is of such a magnitude as to reverse the bias on the intermediate junction 19. At that point, current will flow through the device and will be limited essentially only by the applied voltage and the impedance of the load supplied. The device will continue to conduct under these circumstances after the positive voltage has been removed from the gate electrode 21 as long as the input or anode electrode 10 is positive with respect to the output or cathode electrode 20.

Referring again to Figure 1, it may be seen that the output electrode or cathode 20 of the device 11 is connected through a resistor 22 to the ground bus 8. Thus when the device 11 conducts, current is permitted to flow in the winding 5 and is supplied therefore to the armature 2.

In order that the speed of the motor 1 may be controlled, the invention contemplates the provision of a circuit for supplying a variable voltage to the gate or control electrode 21 of the device 11. The control voltage thus supplied is one which bears a variable phase relationship to the potential supplied via the transformer 6 to the armature 2 and which phase relationship is a function of the speed of the motor and its relationship to a desired speed so that the current supplied to the armature may be varied. In order to accomplish this, the system utilizes the counter electromotive force of the motor which is developed across a voltage divider constituted by resistor 23 connected to a resistor 24, the resistance segment 25 of a potentiometer 26 which is tapped by a slider 27, and a further resistor 28. A positive voltage is supplied to the potentiometer 26 by a conductor 29 connected to a source of unidirectional voltage (not shown). Thus the counter electromotive force of the motor which is directly proportional to the speed of the motor is compared with an adjustable speed reference signal obtained by the setting of the slider 27 of the potentiometer 26. The unbalanced current appearing in the voltage divider is applied via a conductor 30 to a base electrode 31 of a junction transistor 32 having a collector electrode 33 and an emitter electrode 34 to control the conduction of the transistor. The collector electrode 33 is connected to the positive bus 29 through a resistor 35 and to the base electrode 31 through a capacitor 36 while the emitter electrode 34 is connected to the ground bus 8 through a resistor 37. The resistor 37, in combination with the capacitor 36, functions as a typical servo lag network to insure system stability. The device described constitutes a first signal translating stage for the amplification of the difference voltage derived by comparing the counter electromotive or speed signal voltage with the variable speed reference voltage.

In order that a variable phase control signal may be supplied to control the conduction of the device 11, the invention provides a phase shift circuit which is constituted by a transformer 38 having a primary winding 39 which is connected to be supplied from the same source of alternating current as is supplying the primary winding 7 of the transformer 6. A secondary winding 40 of the transformer 38 has connected in series therewith a unidirectional conducting device such as a rectifier 41 in series with a capacitor 42. A resistor 43 is connected in parallel with the rectifier 41 between the capacitor 42 and the secondary winding 40. The operation of the phase shift circuit is such that the rectifying device 41 provides a path for charging the capacitor 42 on half cycles of one polarity of the alternating current control voltage supplied to the transformer primary winding 39. It may be seen that the plate of the capacitor 42 connected to the anode of the rectifier 41 will be charged to the negative peak of the alternation supplied thereto. As the voltage on the cathode of the rectifier 41 becomes less negative than its peak negative value, the capacitor will start to discharge through the resistor 43 at a rate fixed, of course, by the time constant of the circuit. This discharge is in the form of an exponential decay from the negative peak toward ground and will exhibit a sufficiently linear characteristic so that it may be used for the control of the device 11. Inasmuch as the emitter 34 is connected to the junction of the secondary winding 40 and the capacitor 42, a positive variable D.C. voltage will be superimposed on the essentially saw-tooth wave developed at the junction of the capacitor 42 and resistor 43. This D.C. voltage will, of course, vary as the conduction of the transistor amplifier 32 varies, and will be effective to shift the average voltage level of the saw-tooth wave and the point in time when the combination of the two is at the proper value to be effective to cause the device 11 to conduct. Therefore, the control voltage to be supplied to the control electrode 21 is a function of the magnitude of the amplified difference voltage and will be a function of the actual motor speed with respect to the desired or predetermined speed.

The variable phase control signal is amplified and applied to the control electrode 21 of the semi-conductor device 11. Means for amplifying the control signal are illustrated as constituted by a first transistor amplifier 44 having a base electrode 45 which is connected to the junction of the capacitor 42 and the resistor 43, that is, to the discharge path of the capacitor 42 through the resistor 43. An emitter electrode 46 is connected to the ground bus 8 while a collector electrode 47 is connected via a current limiting resistor 48 to a base electrode 49 of a second transistor amplifier 50. The second transistor amplifier 50 is provided with the usual emitter electrode 51 and a collector electrode 52. As may be seen, the emitter electrode 51 is connected to the positive bus 29 while the collector electrode 52 is connected through a current limiting resistor 53 to the control electrode 21 of the semi-conductor device 11. The transistor 44 is of the NPN variety and in the grounded emitter connection illustrated, its collector to emitter current increases as its base electrode 45 goes positive. Increased collector emitter current causes the voltage of collector 47 to go in a negative direction turning on the transistor 50 which is of the PNP variety. Under these circumstances, the voltage on the collector electrode 52 of the transistor 50 goes positive. When the voltage on the collector electrode 52 is sufficiently positive, a value will be reached determined by the characteristics of the device 11 which will reverse the bias on the intermediate junction 19 thereof, causing the device 11 to conduct and, therefore, current to be supplied to the armature 2 of the motor.

In supplying direct current to many types of loads such as the direct current motor shown, it is desirable that the current in the system be limited in order to avoid possible damage due to overheating. Thus when an increase in motor speed is called for by increasing the variable speed reference voltage by adjustment of the slider 27, the motor will accelerate as a consequence of the increased current supplied to the armature. This value of current should be limited to a value which takes into consideration the motor's ability to dissipate the heat generated. Thus, the invention contemplates the provision of a current limit circuit which is constituted by a reference amplifier comprising a transistor 54 having base, collector and emitter electrodes 55, 56 and 57 respectively. The current supplied to the motor armature 2 is measured by the provision of the resistor 22 connected between the output electrode 20 of the device 11 and the conductor 8. Inasmuch as this voltage is a half-wave pulsating voltage, it is desirable that it be filtered by a capacitor 58 and a resistor 58′ prior to its application to the base electrode 55 of the transistor 54. The collector electrode 56 of this transistor is connected via a resistor 59 to the positive bus 29 while the emitter electrode 57 is connected to the slider 60 of a potentiometer 61 having a resistance portion 62 which in conjunction with a resistor 63 constitutes a voltage divider connected across the positive bus 29 on the ground bus 8. The relative value of the voltages on the electrodes of the transistor is fixed by the setting of the slider 60 so that the emitter 57 may be held at some adjustable value of voltage which is positive with respect to the base 55 and the transistor 54 normally maintained in a cut-off condition. As the device 11 conducts, a value of current may be reached such that the base 55 will become positive with respect to the emitter 57 depending upon the setting of the slider 60 causing the transistor 54 to conduct the collector 56 to go in a negative direction. The negative voltage appearing on the collector 56 is transmitted via a conductor 64 and a unilateral conducting device such as a rectifier 65 to the junction of the resistors 23 and 24. The negative voltage supplied by the current limiting circuit will have the effect of decreasing the conduction of the transistor 32 and thus the point at which its emitter 34 is sufficiently positive to block the rectifier 41 and cause the capacitor 42 to discharge through the resistor 43.

With the foregoing in mind, the over-all operation of the system may be described as follows. The slider 27 of potentiometer 26 is set so as to determine the motor speed desired. With the motor 1 at initially zero speed, the counter electromotive force is zero and the base 31 therefore of the transistor 32 is sufficiently positive to cause the transistor 32 to fully conduct and its emitter 34 therefore to be held at some positive value of voltage sufficient to block the rectifier 41 at a point early in positive half cycles of voltage supplied to the anode 10 of the device 11. This may be characterized by stating that the control signal supplied to the electrode 21 of the device 11 is in phase with or lags by a very small amount the phase of the supply voltage applied to the anode 10. Thus the device 11 will conduct early in every other half cycle of applied voltage and the motor 1 will accelerate until a value of speed is reached whereby the counter E.M.F. voltage is equal to the voltage derived from the potentiometer 26. At this point, the transistor amplifier 32 will be maintained substantially in a stable intermediate conducting position and the capacitor 42 will charge and discharge through the rectifier 41 and resistor 43. If the motor speed should change due, for instance, to a change in the load, the conduction level of the transistor 32 will increase or decrease depending upon the direction of the speed change to advance or retard the phase relationship of the control signal and the supply voltage to tend to maintain the speed constant. If during the period of acceleration the current flow to the armature 2 should exceed the amount necessary to cause the transistor 54 to conduct as determined by the setting of the slider 60 of the potentiometer 61, a negative-going signal will be supplied to the base 31 of the transistor 32 in conjunction with the speed signal and speed reference signal to limit the conduction of the transistor amplifier 32 and, therefore, the current supplied to the motor armature 2.

Figure 3 of the drawing illustrates an alternative embodiment of the invention. In this figure, the invention is disclosed in a form suitable for supplying controlled full-wave rectified direct current potential to a load such as a direct current motor. In this figure, those elements which correspond to the elements of Figure 1 have been given the same reference numeral.

In this embodiment, the motor 1 is connected to be supplied from a source of alternating current connected to the transformer 6. The secondary winding 5 is connected to the input junctions 70, 71 of a full-wave rectifying bridge which is provided with rectifying devices 72 and 73 in two arms thereof and controlled semi-conducting rectifying devices 74 and 75 in the other two arms thereof, while the armature 2 of the motor is connected across the output junctions 76 and 77 of the bridge. The motor field 3 is connected to be supplied by a direct current derived from source of alternating current supplying the primary winding 80 of a transformer 81 having a secondary winding 82. The alternating current supplied to the transformer 81 is rectified by a rectifying device 83 so that half-wave rectified direct current is supplied to the field 3, which voltage is also supplied as operating potential for other elements of the system. Positive potential for the operation of the transistor amplifiers is derived from the rectifier 83 by a conductor 84 connected to one side of the motor field while positive direct current for deriving the variable speed reference signal is available on a conductor 85 connected to the other side of the motor field. A filter network 86 is provided in order to eliminate the pulsations appearing in the half-wave rectification effected by this portion of the system. Also included in the variable speed reference signal is a minimum speed potentiometer 87 having a resistance portion 87' and a slider 88.

The controlled semi-conductor rectifiers 74 are each provided with input electrodes 90, output electrodes 91 and control electrodes 92. A means is provided for sensing the current supplied to the armature 2 which is constituted by the resistor 22 which has connected thereacross a resistance segment 93 of a potentiometer 94. A slider 95 of the potentiometer 94 is connected via a dropping resistance 96 to the base electrode 55 of the transistor 54. Connected between the collector electrode 56 and the base electrode 55 of the transistor 54, there is provided a capacitor 100 for the purpose of stabilizing the output of the transistor amplifier 54.

The operation of this circuit is similar to that of the circuit disclosed in Figure 1. Thus the slider 27 of the speed reference potentiometer 26 is set to provide a reference voltage in order that the desired speed may be determined. The difference signal obtained by comparing the reference signal and the feedback signal constituted by the counter electromotive force of the motor is amplified by the transistor amplifier 31. The difference signal after amplification is supplied to the phase shift circuits and is superimposed on the essentially sawtoothed wave at the junction of the resistors 43 and 43' to determine the point in time at which this combination of signals is sufficiently positive to cause the devices 74 and 75 to conduct. Inasmuch as the charging voltages supplied to the capacitors 42 and 43' are 180° out of phase as are the voltages applied to the anodes 92 of the controlled rectifying devices 74 and 75, the signals to be amplified by the cascaded transistor amplifiers 44 and 50 and 44' and 50' will be 180° out of phase and therefore will control the conduction of the devices 74 and 75 in accordance with the setting of the speed control potentiometer 26. As may be seen, the voltage across potentiometer 26 is a function of the position of its slider 27 and the value of the resistance in the minimum speed potentiometer 87 which may be adjusted by the setting of its slider 88. Thus a minimum reference signal is impressed across the potentiometer 26 and a means is provided whereby the minimum speed of the motor may be controlled.

The full-wave bridge supplying the armature 2 functions as follows. When the controlled rectifier 74 conducts during a portion of one-half cycle as a consequence of having a positive current of sufficient magnitude supplied to its gate electrode 92 from its corresponding phase shift, a current path is established from the junction 71, the anode 90 and cathode 91 of the device 74, junction 77, resistor 22, armature 2, junction 76, and rectifier 73 to junction 70. On the opposite cycle of the alternating supply, the device 75 will conduct and current will flow in a path from junction point 70, the anode 90 and cathode 91 of the device 75, junction 77, resistor 22, armature 2, and rectifier 72 to junction 71. The portion of each half cycle in which the devices 74 and 75 conduct is determined by the phase relationship of the control signals and the alternations of the supply voltage. The phase of the control signals is determined by the value of the difference signal derived by comparing the feedback signal and the reference signal, and will be delayed or advanced depending upon whether the motor is running above or below the speed determined by the setting of the potentiometer 26.

The current limit circuit in this embodiment of the invention operates by maintaining the emitter 57 of the transistor 54 normally positive with respect to its base 55. The extent to which it is positive and the transistor 54 therefore cut off is determined by the setting of the slider 95 of the potentiometer 94. As the current across the resistor 22 increases in response to increased conduction of the devices 74 and 75, the base 55 of the transistor 54 will go positive causing the transistor to conduct and the voltage on its collector 56 to drop. The negative-going voltage on the collector 56 will be coupled through the rectifying device 65 as before in order to modify the conduction of the transistor amplifier 32.

In order to increase the positiveness of the current take-over action the control signal amplifiers constituted by the transistors 44 and 44' and 50 and 50' may be connected to ground bus through the diodes 105 connected between the emitters 46 and 46' of the transistors 44 and 44' so that the emitters are maintained at slight positive voltage with respect to ground. Also, it may be found desirable or necessary to protect the controlled rectifying devices 74 and 75 from negative-going potentials on their control electrodes 92 and this may be accomplished by the provision of the rectifying devices 107 and 108 connected so as to conduct only positive-going voltage from the collectors 52 and 52' of the transistors 50 and 50' respectively.

While the invention has been described by reference to a particular embodiment thereof, it will be understood that numerous modifications may be made by those skilled in the art without departing from the invention. I, therefore, aim in the appended claims to cover all such equivalent variations as come within the true spirit and scope of my invention.

What I claim as new and desire to secure by Letters Patent of the United States is:

1. A control system for an electric motor having an armature and a field winding, comprising a source of alternating voltage, a semi-conductor device having a plurality of PN junctions and input, output and control electrodes, said input and output electrodes connected in series with said source and said armature, means for deriving a signal voltage proportional to the speed of said motor, means for providing an adjustable speed reference voltage, means for comparing said signal voltage and said reference voltage, a first transistor amplifier having input and output electrodes, said input electrodes being connected to said last-mentioned means, a phase shift circuit comprising a source of alternating control voltage, a capacitor, means for charging said capacitor on one half cycle of said control voltage from said source of control voltage and providing a discharge path for said capacitor, said phase shift circuit being connected to an output electrode of said first transistor amplifier, a second transistor amplifier having input and output electrodes, an input electrode of said second transistor amplifier being connected to the junction of said capacitor and said discharge path, said control electrode of said semi-conductor device being connected to an output electrode of said second transistor amplifier which is positive when said second transistor amplifier conducts to cause said device to conduct and supply voltage to said armature, a third transistor amplifier having input and output electrodes, means connecting one of said input electrodes of said third transistor amplifier to an output electrode of said semi-conductor device, means for variably biasing said third transistor amplifier, and means for connecting an output electrode of said third transistor amplifier to an input electrode of said first transistor amplifier to provide a feedback voltage to modify the effect of said signal voltage.

2. A control system for an electric motor having an armature and a field winding, comprising a source of alternating voltage, a semi-conductor device having an odd number of PN junctions and input, output and control electrodes, said armature and said device being connected in series with said source, means to control the conduction of said device comprising means for deriving a signal voltage proportional to the speed of said motor, means for providing an adjustable speed reference voltage, means for amplifying the voltage difference of said signal voltage and said reference voltage, a phase shift circuit comprising a source of control voltage, a capacitor, means for providing a charging path to said capacitor from said source of control voltage and providing a discharge path for said capacitor, means connecting the output of said amplifying means to said phase shift circuit to provide a variable phase control signal, second amplifying means connected to the junction of said capacitor and said discharge path, and means connecting said control electrode of said device to said second amplifying means.

3. A control system for an electric motor having an armature and a field winding, comprising a source of alternating voltage, a semi-conductor device having an odd number of PN junctions and input, output and control electrodes, said armature and said device being connected in series with said source, means to control the conduction of said device comprising means for deriving a signal voltage proportional to the speed of said motor, means for providing an adjustable speed reference voltage, means for amplifying the voltage difference of said signal voltage and said reference voltage, a phase shift circuit comprising a source of control voltage, a capacitor, means for providing a charging path to said capacitor from said source of control voltage and providing a discharge path for said capacitor, means connecting the output of said amplifying means to said phase shift circuit to provide a variable phase control signal, second amplifying means connected to the junction of said capacitor and said discharge path, means connecting said control electrode of said device to said amplifying means, further amplifying means connected to said output electrode of said device, means providing a variable bias for said further amplifying means to control the conduction thereof, and means connecting the output of said further amplifying means to said means for amplifying said difference voltage to control the conduction of said amplifying means.

4. A control system comprising means for deriving a signal voltage proportional to an actual characteristic of a load to be controlled, a source of supply voltage, a semiconductor device having an odd number of PN junctions and input, output and control electrodes, said device being connected in series with said source of supply voltage and said load, means for providing an adjustable characteristic reference voltage, means for adding said signal voltage and said reference voltage, means for amplifying the difference voltage of said signal voltage and said reference voltage, a phase shift circuit comprising a source of control voltage, a capacitor and a charging and a discharging path for said capacitor, means connecting said amplifying means to said phase shift circuit to provide a variable phase control signal, and further amplifying means having an input circuit connecting the junction of said capacitor and said discharge path and an output circuit connected to said control electrode.

5. A control system comprising means for deriving a signal voltage proportional to an actual characteristic of a load to be controlled, a source of supply voltage, a semi-conductor device having an odd number of PN junctions and input, output and control electrodes, said device being connected in series with said source of supply voltage and said load, means for providing an adjustable characteristic reference voltage, means for adding said signal voltage and said reference voltage, means for amplifying the difference voltage of said signal voltage and said reference voltage, a phase shift circuit comprising a source of control voltage, a capacitor and a charging and a discharging path for said capacitor, means connecting said amplifying means to said phase shift circuit to provide a variable phase control signal further amplifying means having an input circuit connecting the junction of said capacitor and said discharge path and an output circuit connected to said control electrode, and means responsive to the current supplied to said load to modify said signal voltage.

6. A control system comprising means for deriving a signal voltage proportional to an actual characteristic of a load to be controlled, a source of supply voltage, a semi-conductor device having an odd number of PN junctions and input, output and control electrodes, said device being connected in series with said source and said load, the maximum value of voltage from said source being such that at least one of said junctions in said device is normally reversed bias whereby said device is in a non-conducting state, means for providing an adjustable characteristic reference voltage, means for comparing said signal voltage and said reference voltage to derive a difference voltage, a phase shift circuit, means for supplying said difference voltage to said phase shift circuit, said phase shift circuit including means responsive to said difference voltage to provide a control voltage of a polarity to forwardly bias said at least one of said junctions, and means coupling said control voltage to said control electrode.

7. A control system for an electric motor having an armature and a field winding comprising a source of alternating voltage, means connected between said source and said armature to supply unidirectional potential to said armature on each half cycle of said alternating voltage, said means comprising semi-conductor means having an odd number of PN junctions and input, output and control electrodes, said input and output electrodes connected between said source and said armature, means for deriving a signal voltage proportional to the speed of said motor, means for providing an adjustable speed reference voltage, means for comparing said signal voltage and said reference voltage to provide a difference voltage, means amplifying said difference voltage, a phase shift circuit comprising a source of control voltage, a capacitor, means providing a charging path and a discharging path between said capacitor and said source of control voltage, connections between said amplifying means and said phase shift circuit to provide a variable phase control signal and further amplifying means having an input connected to said capacitor and said discharge path and an output connected to said control electrode to control the unidirectional voltage supplied to said armature.

8. A control system as defined in claim 7 including means responsive to the current flow through said armature to control said amplifying means.

9. A control system for an electric motor having an armature and a field winding, a source of alternating voltage, a rectifying bridge comprising four unilateral conducting devices, connected between said source and said armature to supply unidirectional potential to said armature, two of said unilateral conducting devices comprising semi-conductor devices having an odd number of PN junctions and a control electrode, means for deriving a signal voltage proportional to the speed of said motor, means for producing an adjustable speed reference voltage, means for comparing said signal and reference voltage to provide a difference voltage, a pair of phase shift circuits, each phase shift comprising a source of control voltage, a capacitor and a charging and discharging path provided between said source of control voltage and said capacitor, a signal translating stage connected between said comparing and said phase shift circuits and responsive to said difference voltage to provide a voltage effective to interrupt said charging path, and further signal translating stages having inputs connected to said capacitor and said discharge path in each phase circuit and outputs connected to said control electrodes to control the conduction of said semi-conductor devices.

References Cited in the file of this patent

UNITED STATES PATENTS 2,877,359    Ross    Mar. 10, 1959

FOREIGN PATENTS 669,850    Great Britain    Apr. 9, 1952